Patented Sept. 1, 1925.

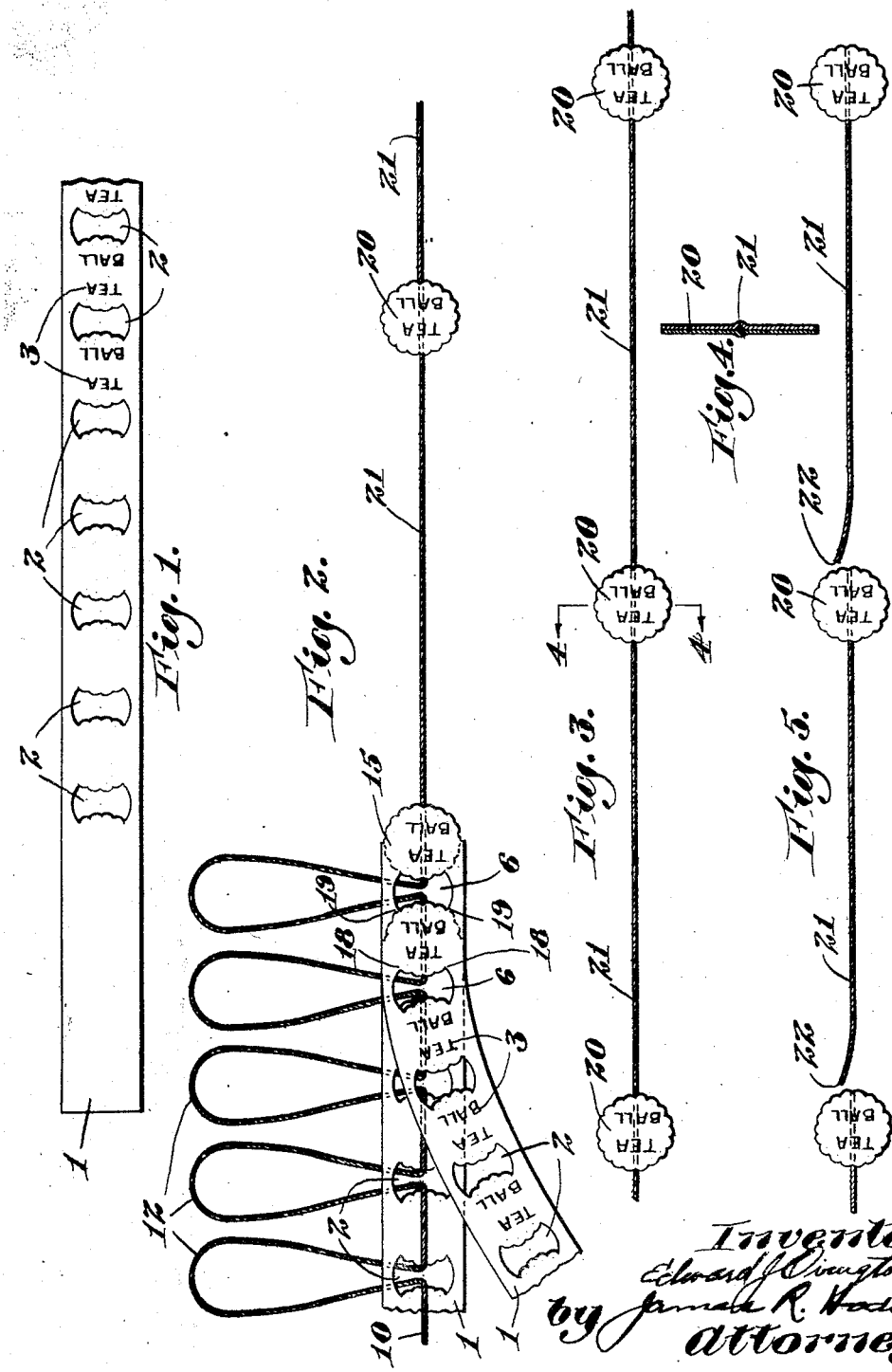

1,551,686

UNITED STATES PATENT OFFICE.

EDWARD J. OVINGTON, OF NEWTON, MASSACHUSETTS.

STRING AND TAG AND PROCESS OF MAKING.

Application filed December 22, 1923. Serial No. 682,338.

*To all whom it may concern:*

Be it known that I, EDWARD J. OVINGTON, a citizen of the United States, and resident of Newton, in the county of Middlesex and State of Massachusetts, have invented an Improvement in Strings and Tags and Processes of Making, of which the following description, in connection with the accompanying drawings, is a specification, like letters on the drawings representing like parts.

My present invention is a novel tag and attaching string and is a modification of my copending application Ser. No. 682,339, filed Dec. 22, 1923, wherein I have illustrated one method of forming, as a continuous operation, a united string and tag material, which tag material is subsequently severed into individual single tag and string lengths. In my present application I have illustrated and herein claimed a different method of carrying out the process explained and claimed broadly in said prior application. The importance of forming a tag and attached cord or string, as a continuous operation and permitting of great speed in manufacturing, as well as economy in production, is fully explained in my said copending application. In my present application I have devised a method of attaching to a single string, a plurality of tag materials, particularly intended for use in tea ball tags or the like, a method of making same by attaching double layers of tag material with the attaching cord arranged symmetrically. This produces a much more artistic and attractive article of manufacture. In carrying out my invention I specially prepare two strips, each of duplicate formation, contour and size, then I attach these two strips or layers together with the attaching cord arranged centrally, positioning loops of predetermined length through suitable recesses in the layers of tag material, whereby subsequently individual tags with attached cords can be readily severed, resulting in an extremely attractive tea tag of suitable size to carry printing, advertising and the like, as well as giving a firm, strong union between the tag and the attaching cord to enable an article such as a tea bag attached to the other end of the cord to be lifted by grasping the tag itself, thus giving a firm handhold therefor.

Referring to the drawings,

Fig. 1 illustrates a fragmentary portion of a section of one of the layers prepared to carry out my present invention;

Fig. 2 is a view illustrating the method of uniting two strips with the attaching cord arranged centrally therebetween;

Fig. 3 is a view showing the resulting tags and attached cord;

Fig. 4 is a cross-sectional view on the line 4—4 of Fig. 3; and

Fig. 5 shows the completely severed individual tea tags and strings.

Referring to the drawings I first prepare duplicate strips of tag material, preferably paper, pasteboard or the like, of equal width and very considerable length, such strips being indicated at 1. By my method of continuous process of manufacture, I move said strips past suitable cutting devices, forming therein openings or recesses 2, 2, 2. Simultaneously or successively suitable printing may be formed thereon as indicated at 3, 3, this appearing on that portion which is to be subsequently severed into the individual tag. A plurality of these strips are then arranged for uniting the same into a complete doubled tag strip, as shown at Fig. 2, these strips being positioned so that the recesses 2, 2, will register in each layer, as illustrated at 6, Fig. 2. Prior to or during the operation of uniting the two strips, a cord, string or thread 10 is positioned centrally of the strips and loops 12 are formed of suitable lengths by drawing or feeding the cord 10 through the recesses 2 of one of the strips. Suitable adhesive being applied to the contacting faces of the strips as they are arranged together with the cord 10 interposed therebetween, and positioned centrally thereof, results in the formation of the completed double strip material as shown at 15 and the extended loop 12 of suitable length for subsequent severing into individual tags and attached strings.

By my present arrangement of cutting out the recesses 2 and consequently presenting a combined opening 6 through both layers in the completed tag material, I am enabled to cut out or die, stamp or the like, and as a machine operation, without cutting the cord, the subsequent individual tea tags, this action requiring only the cutting operation from 18 to 19, as shown in Fig. 2, thus automatically producing, and during the continuous feeding action of the materials, the completed tag 20, with the attached length 21 of cord or string 21. As illustrated at Fig. 4, the cord 21 is firmly united centrally of the tag, and thus affords a firm, neat and balanced lifting position when the tag is raised or grasped for manipulating the tea ball or other article attached at the other end of the cord. Subsequently the length of cord 21 is cut as shown at 22 adjacent the next succeeding tag 20. All the operations above described, are capable of being automatically performed and in quick succession, either by hand as above explained, or by appropriate machinery. The resulting tag with the attaching cord or string positioned centrally between double layers is also, I believe, a novelty and I am claiming the same broadly herein.

My invention is further described and defined in the form of claims as follows:

1. The process of uniting tags and an attaching cord positioned approximately centrally thereof, which consists in preparing strips of equal width of tag material, cutting registering recesses therein, positioning a cord symmetrically of one of said strips and drawing a loop of predetermined length through the recesses thereof, folding said strips together to bring adjacent faces into contact and with the cord therebetween, and securing the strips to each other and subsequently cutting individual tags from the tag strip.

2. The process of uniting tags and an attaching cord positioned approximately centrally, which consists in preparing two strips of equal width of tag material, cutting recesses therein, positioning a cord symmetrically of said strip and drawing a loop of predetermined length through the recesses of one strip, uniting said strips on their contacting faces with the cord therebetween, and subsequently cutting individual tags from the tag strip of doubled material.

In testimony whereof, I have signed my name to this specification.

EDWARD J. OVINGTON.